US009345967B2

(12) United States Patent
Zhang et al.

(10) Patent No.: US 9,345,967 B2
(45) Date of Patent: May 24, 2016

(54) METHOD, DEVICE, AND SYSTEM FOR INTERACTING WITH A VIRTUAL CHARACTER IN SMART TERMINAL

(71) Applicant: Tencent Technology (Shenzhen) Company Limited, Shenzhen, Guangdong (CN)

(72) Inventors: Zhenwei Zhang, Shenzhen (CN); Ling Wang, Shenzhen (CN); Fen Xiao, Shenzhen (CN); Zhehui Wu, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 81 days.

(21) Appl. No.: 14/222,550

(22) Filed: Mar. 21, 2014

(65) Prior Publication Data

US 2014/0213361 A1    Jul. 31, 2014

Related U.S. Application Data

(63) Continuation of application No. PCT/CN2013/084856, filed on Nov. 26, 2013.

(30) Foreign Application Priority Data

Jan. 25, 2013 (CN) .......................... 2013 1 0029685

(51) Int. Cl.
| | |
|---|---|
| A63F 13/12 | (2006.01) |
| A63F 13/211 | (2014.01) |
| A63F 13/65 | (2014.01) |
| A63F 13/216 | (2014.01) |
| A63F 13/213 | (2014.01) |
| A63F 13/332 | (2014.01) |

(52) U.S. Cl.
CPC .............. *A63F 13/211* (2014.09); *A63F 13/213* (2014.09); *A63F 13/216* (2014.09); *A63F 13/332* (2014.09); *A63F 13/65* (2014.09); *A63F 2300/204* (2013.01); *A63F 2300/8082* (2013.01)

(58) Field of Classification Search
CPC ................................ A63F 13/10; A63F 13/12
See application file for complete search history.

(56) References Cited

U.S. PATENT DOCUMENTS

| 2011/0242134 A1 | 10/2011 | Miller et al. | |
| 2012/0293518 A1* | 11/2012 | Geisner et al. | 345/474 |
| 2013/0293586 A1* | 11/2013 | Kaino et al. | 345/633 |

FOREIGN PATENT DOCUMENTS

| CN | 1614536 A | 5/2005 |
| CN | 101098241 A | 1/2008 |
| CN | 103116451 A | 5/2013 |
| JP | 2002153668 A | 5/2002 |

OTHER PUBLICATIONS

International Searching Authority, The State Intellectual Property Office, Form PCT/ISA/237 for IA Application No. PCT/CN2013/087856, International Search Report and Written Opinion, Mar. 6, 2014, China.

* cited by examiner

*Primary Examiner* — Omkar Deodhar
(74) *Attorney, Agent, or Firm* — BrainSpark Associates, LLC

(57) ABSTRACT

A method, device, and system for interacting with a virtual character in a smart terminal are provided. The method can shoot and display a user reality scene image on a screen of the smart terminal, and superimpose the virtual character on the user reality scene image; acquire position of the smart terminal during movement; and determine whether change of the position of the smart terminal exceeds a preset threshold value, and if the change of the position of the smart terminal exceeds the preset threshold value, the method moves the virtual character in the user reality scene image according to the current position of the smart terminal. The interaction scene between the user and the virtual character is not a virtual scene but a true reality scene, both numbers and contents of the scenes are not limited, and the interaction efficiency in this manner is higher.

10 Claims, 5 Drawing Sheets

METHOD, DEVICE, AND SYSTEM FOR INTERACTING WITH A VIRTUAL CHARACTER IN SMART TERMINAL

CROSS REFERENCE TO RELATED APPLICATIONS

This application is a U.S. continuation application of International Application PCT/CN2013/087856, with an international filing date of Nov. 26, 2013, which claims the priority benefit of Chinese Patent Application No. 201310029685.8 filed on Jan. 25, 2013, the contents of which are both incorporated herein by reference in their entireties for all purposes.

FIELD OF THE PRESENT INVENTION

The present disclosure relates to an augmented reality technology, and in particular, to a method, device, and system for interacting with a virtual character in a smart terminal.

BACKGROUND

With rapid development of computer technology and network technology, Internet and instant communication technology play an increasingly important role in people's daily life, study and job. Moreover, with development of mobile Internet, the Internet also develops towards mobilization. In the current information age, various information devices emerge at the right moment, including fixed-line phones and mobile phones for voice transmission, servers and personal computers for information resource sharing and processing, and a variety of TVs for video data display, etc. These devices are designed to solve actual need in particular areas. With coming of fusion of Consumer electronics, Computer and Communication (3C), people pay more and more attention to research on comprehensive utilization of information devices in different areas, in order to make full use of existing resources and facilities to provide better service.

Smartphone generally refers to a kind of terminals that, like personal computers, have independent operation system, can be installed by a user programs such as software, games, and the like provided by a third-party service provider to continuously extend its functions, and can access to a wireless network such as the mobile communication network. On the current smart terminal, multiplayer computer game online service, which allows players on the Internet to easily play the game through the Internet as in the same Local Area Network, may be provided to Internet users.

In various current manners for interacting with virtual characters in a smart terminal, interaction scenes are virtual scenes designed by the developer themselves. However, since the virtual scenes are designed by the designer, both numbers and contents of the scenes are limited. So the interaction efficiency in these manners is lower.

Moreover, since the virtual scene is virtual and need to be designed and developed by the designer and developer, both the development cost and maintenance cost are very expensive; it is very difficult to control costs.

SUMMARY OF THE PRESENT INVENTION

An embodiment of the present invention provides a method for interacting with a virtual character in a smart terminal, which is capable of improving interaction efficiency.

Another embodiment of the present invention provides a device for interacting with a virtual character in a smart terminal, which is capable of improving interaction efficiency.

Another embodiment of the present invention provides a system for interacting with a virtual character in a smart terminal, which is capable of improving interaction efficiency.

The technical solutions of the embodiments of the present invention are below.

The method for interacting with the virtual character in the smart terminal, the method comprises the steps of:

shooting and displaying a user reality scene image on a screen of the smart terminal, and superimposing the virtual character on the user reality scene image;

acquiring position of the smart terminal during movement; and determining whether change of the position of the smart terminal exceeds a preset threshold value, and if the result is "YES", moving the virtual character in the user reality scene image according to the current position of the smart terminal.

The device for interacting with the virtual character in the smart terminal, the interaction device comprises:

virtual character superimposition unit for shooting and displaying a user reality scene image on a screen of the smart terminal and superimposing the virtual character on the user reality scene image;

position acquisition unit for acquiring position of the smart terminal during movement; and virtual character movement unit for determining whether change of the position of the smart terminal exceeds a preset threshold value, and if the result is "YES", moving the virtual character in the user reality scene image according to the current position of the smart terminal.

The system for interacting with virtual characters in smart terminals, the interaction system comprises:

first smart terminal, for shooting and displaying a first smart terminal user reality scene image on the screen, superimposing a first virtual character on the first smart terminal user reality scene image, and sending information of the first virtual position of the first virtual character in the first smart terminal user reality scene image to an interactive server; acquiring position of the first smart terminal during movement, determining whether change of the position of the first smart terminal exceeds a preset threshold value, and if the result is "YES", moving the first virtual character in the first smart terminal user reality scene image according to the current position of the first smart terminal;

second smart terminal, for shooting and displaying a second smart terminal user reality scene image on the screen, superimposing a second virtual character on the second smart terminal user reality scene image, and sending information of the second virtual position of the second virtual character in the second smart terminal user reality scene image to the interactive server; acquiring position of the second smart terminal during movement, determining whether change of the position of the second smart terminal exceeds a preset threshold value, and if the result is "YES", moving the second virtual character in the second smart terminal user reality scene image according to the current position of the second smart terminal; and the interactive server, for storing the information of the first virtual position of the first virtual character in the first smart terminal user reality scene image and the information of the second virtual position of the second virtual character in the second smart terminal user reality scene image, and transferring the first virtual character to the first virtual position on the second smart terminal user reality scene image and the second virtual character to the second virtual position on the first smart terminal user reality scene image when distance from the first virtual position to the second virtual position is less than the preset threshold value.

It can be seen from the above solutions, in the embodiments of the prevent invention, the user reality scene image is shot and displayed on the screen of the smart terminal, the virtual character is superimposed on the user reality scene image; position of the smart terminal during movement is acquired; and it is determined whether change of the position of the smart terminal exceeds a preset threshold value, and if the result is "YES", the virtual character is moved in the user reality scene image according to the current position of the smart terminal. Thus, after the embodiment of the present invention is applied, reality scenes are recorded as virtual interaction scenes using the photographing technology, virtual characters are obtained in the real scenes, and the following operation of virtual characters may be controlled based on movement of the users. Since the interaction scene between the user and the virtual character are not virtual scenes but true reality scenes, both numbers and contents of the scenes are not limited, and the interaction efficiency in this manners is higher.

Moreover, since interaction scenes are true reality scene and do not need to be designed and developed by the designer and developer, both development cost and maintenance cost are reduced.

DETAILED DESCRIPTION

The present disclosure will be described in further detail below with reference to the accompanying drawings, in order that objects, technical solutions, and advantages of the present disclosure are more apparent.

In an embodiment of the present invention, reality scenes are recorded as virtual interaction scenes using the photographing technology, and virtual characters are obtained by the Augmented Reality (AR) technology. A user may control these virtual characters (for example, the obtained game characters, animals, etc.) to perform in the reality scene various interaction actions, for example, may control virtual characters to perform adventure and war, and may also control virtual characters to trade or to live normally. Account information, position information, the photographed scenes, and information of virtual characters may be stored in a server or a smart terminal, such that the user may observe virtual characters located near them, i.e., "living" around them through cameras.

Figure 1:
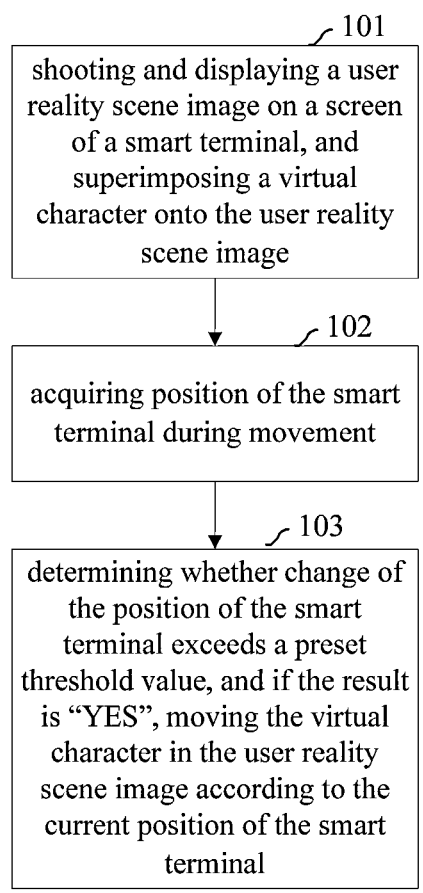
FIG. 1 is a flow diagram showing a method for interacting with a virtual character in a smart terminal according to an embodiment of the present invention.

FIG. 1 is a flow diagram showing a method for interacting with a virtual character in a smart terminal according to an embodiment of the present invention.

As shown in FIG. 1, the method comprises the following steps.

Step 101: shooting and displaying a user reality scene image on a screen of a smart terminal, and superimposing the virtual character on the user reality scene image.

Here, a camera unit of the smart terminal may be used to shoot the user reality scene image of the environment where the user is located currently. For example, assuming that the user is currently locating downstairs in the office building, the camera unit of the smart terminal may be opened to shoot the environment near the building, and the shot building environment image is just the user reality scene image.

In an embodiment of the present invention, the virtual character is further superimposed on the user reality scene image. The virtual character may be set in advance by the user, and various attribute information of the virtual character may be stored in the smart terminal, and may also be stored in the network-side server.

Here, the user reality scene image shot by using the camera of the smart terminal is preferably a continuous video. Moreover, the camera of the smart terminal may be specifically a digital camera, which can convert an analog video signal generated by a video capture device into a digital signal, and then store it in the storage device of the smart terminal.

An embodiment of the present invention may superimpose the virtual character on the user reality scene image by the Augmented Reality (AR) technology, which is a technology that increases the user's perception to the real world using the information provided by the computer system, applies the virtual information to the real world, and superimposes the virtual object, scene, and system prompt information generated by the computer on the real scene to achieve argument to reality.

Based on the AR technology, the virtual character, which does not exist in the real environment, may be generated by combining the computer graphics technology with the visualization technology, and may be accurately "placed" in the real world using sensing technology. The virtual character and the real world fuse and present the user a new environment with a real sensation effect. The user of the smart terminal may keep moving, since the user of the smart terminal grips the smart terminal, and the camera of the smart terminal keeps open, the user reality scene image is changing all the time.

The reality scene image may be a panoramic image. Panorama-based virtual reality system is more widely used in various fields due to its advantages, for example, low hardware requirements, better realism and the like. Panorama technology is a virtual reality technology, which can simulate the live visual experience of the user located in a certain position of the real scene, has a strong sense of immersion, gives the user an immersive user experience, and has an important application value.

A viewpoint refers to an observation point in the virtual scene at a time, and functions to manage the panorama in the generation of the virtual scene. Panorama roaming is mainly divided into roaming within fixed viewpoints and roaming between different viewpoints. Panorama browsing technology of the fixed viewpoints is relatively mature.

In an embodiment of the present invention, the smart terminal may specifically include, but not limited to, feature phones, smart phones, PDAs, personal computers (PC), tablet computers or personal digital assistants (PDA), and so on.

Moreover, the smart terminal may be applicable to any smart terminal operation system. The specifically available operation system may include, but are not limited to Andorid, Palm OS, Symbian, Windows mobile, Linux, Android, iPhone OS, Black Berry OS 6.0, Windows Phone series, and so on.

In an embodiment of the present invention, the smart terminal may specifically employ Android operation system, and the smart terminal can be applicable to various versions of the Andorid, including but not limited to, Astro Boy (Andriod Beta), Clockwork Robot (Android 1.0), Cupcake (Andriod 1.5), Donut (Android 1.6), Muffins (Android 2.0/2.1), Frozen yogurt (Android 2.2), Gingerbread (Android 2.3), Honeycomb (Android 3.0), Ice Cream Sandwich (Android 4.0), Jelly Bean (Jelly Bean, Android 4.1).

The specific versions of the Android platform are listed in the foregoing description, one skilled in the art will recognize that the embodiments of the present invention are not limited to the above listed version and may be also applicable to any other versions based on Android software architecture.

Step 102: acquiring position of the smart terminal during movement.

Here, the position of the smart terminal during movement may be acquired using a variety of ways, when the user of the smart terminal moves.

For example, GPS positioning, GPRS positioning, Bluetooth positioning, Wifi positioning or mobile communication network base station positioning may be applied to acquire the position of the smart terminal during movement.

More specifically, GPS-based positioning uses the GPS positioning module in the smart terminal to realize the smart terminal positioning. Base station positioning uses the measured distance from the base station to the smart terminal distance to determine the position of the smart terminal. Base station positioning does not need the smart terminal to have a GPS positioning capability, but its accuracy depends largely on distribution of the base station and size of coverage. Usually, the positioning accuracy of GPS-based positioning is higher.

In an embodiment of the present invention, GPRS positioning, Bluetooth positioning, Wifi positioning and the like may be used separately or in combination. Using these positioning modes, the position of the smart terminal during movement may be acquired.

Step 103: determining whether change of the position of the smart terminal exceeds a preset threshold value, and if the result is "YES", moving the virtual character in the user reality scene image in accordance with the current position of the smart terminal.

During movement of the user of the smart terminal, the position of the smart terminal during movement may be acquired based on Step 102, and the position changes as the user moves.

It may be determined whether change of the position of the smart terminal exceeds the preset threshold value. If the result is "YES", the virtual character is moved in the user reality scene image according to the current position of the smart terminal. For example, the virtual character may be moved to the current position of the smart terminal in the user reality scene image, in order to achieve movement of the virtual character following the user of the smart terminal in the reality scene image.

In one embodiment, position fine adjustment information of the screen of the smart terminal during movement is further detected; and the virtual character is adjusted in the user reality scene image in accordance with the position fine adjustment information. Wherein, the position fine adjustment information may be detected by using a direction sensor, an image recognition processor or the like provided in the smart terminal, and the virtual character is fine adjusted.

In one embodiment, when it is detected that a swing occurs in the screen of the smart terminal, swing angle of the swing is acquired; the virtual character superimposed on the user reality scene image is swung at the swing angle in a direction opposite to the swing, to maintain absolute positioning of the virtual character on the user reality scene image.

The direction sensor of the smart terminal may be employed to achieve specially handling with respect to the swing. When the user swings the screen of the smart terminal, the direction sensor may direct change in the screen of the smart terminal, in order to change the view angle of the virtual character, and ensure that the virtual character which the user see through the screen and the user reality scene image maintain absolute positioning.

More specifically, assuming that a swing occurs in the screen of the smart terminal and the swing angle is 30 degree to the right, the virtual character superimposed on the user reality scene image may be swung 30 degree to the left, and thereby the virtual character and the user reality scene image maintain absolute positioning.

For another example, assuming that a swing occurs in the screen of the smart terminal and the swing angle is 90 degree to the left, the virtual character superimposed on the user reality scene image may be swung 90 degree to the right, and thereby the virtual character and the user reality scene image maintain absolute positioning.

In one embodiment, movement amount of the smart terminal during movement of the smart terminal is detected based on image recognition with regard to change in the reality scene image; it is determined whether the movement amount of smart terminal exceeds a preset threshold value, and if the result is "YES", the virtual character is moved in the user reality scene image according to the current movement position of the smart terminal.

Preferably, the image recognition process can assist the direction sensor of the smart terminal in detecting change in spatial position of the smart terminal. For example, when the smart terminal translates, the direction sensor does not work, and then movement distance or ratio of the smart terminal may be detected using the image recognition operation, in order to enhance reality Preferably, user account information of the smart terminal, in which the correspondence relationship between the user of the smart terminal and the virtual character are stored, and attribute information of the virtual character are further provided.

In an embodiment of the present invention, a plurality of user accounts of smart terminals may be provided, and these user accounts of smart terminals achieve online through networking. When a plurality of users of the smart terminal are online, compass of each smart terminal may identify terminal pointing directions of different smart terminal users, such that position deviation does not appear when the user player of the smart terminal observes virtual characters of users of other smart terminals.

Preferably, the gravity sensor of the smart terminal may detect acceleration (v) and movement time (t) of the smart terminal during movement, and cooperates with the movement direction and movement distance calculated by the compass of the smart terminal, in order to assist the smart terminal positioning system such as GPS in detecting movement amount of the user.

Preferably, a trigger geography location and a virtual character trigger event corresponding to the trigger geography location may be set in advance; it is determined whether the smart terminal reaches the trigger geography location according to the position of the smart terminal, if the result is "YES", it enables the virtual character to perform the virtual character trigger event corresponding to the trigger geography location. Based on the above-mentioned process to the virtual character trigger, the virtual characters may interact with certain occasions of reality.

For example, a hospital in reality may be set as a trigger geography location, and the corresponding virtual character trigger event is set as life enhance event. Then, when the user of the smart terminal moves to the hospital in reality, it is determined whether the smart terminal reaches the hospital according to the position of the smart terminal, it enables the virtual character to perform the virtual character trigger event corresponding to the trigger geography location, i.e., the virtual character may enhance its life through those operations such as "treating" and "blooding" in the hospital.

The embodiments of the present invention may be applicable to various smart terminal browsers, and these browsers may specifically include browsers such as Microsoft's Internet Explorer, Mozilla's Firefox, Apple's Safari, Opera, Google Chrome, Green Browser, etc.

Figure 2:
FIG. 2 is a first schematic diagram showing interaction with the virtual character in the smart terminal according to the embodiment of the present invention.
Figure 3:
FIG. 3 is a second schematic diagram showing interaction with the virtual character in the smart terminal according to the embodiment of the present invention.

FIG. 2 is a first schematic diagram showing interaction of the virtual character in the smart terminal according to the embodiment of the present invention; FIG. 3 is a second schematic diagram showing interaction of the virtual character in the smart terminal according to the embodiment of the present invention.

As can be seen from FIG. 2, the current use reality scene image is in front of the building, and at this time, the user opens the camera of the smart terminal, and selects one virtual character (shown as Penguin in FIG. 2). The user sees on the screen that his own virtual character "appears" in the real world by moving the smart terminal, and the user may grip smart terminal with the camera open, and move his position, and then the virtual character on the screen will follow the user.

As shown in FIG. 3, the user can also control interaction such as eating, exercise, and the like between the virtual character and other virtual things, to make its own virtual character continue to grow, and so on. The user can also online with other users, see their own and other virtual characters on the screen, and perform various interaction operations such as games, fighting, and the like.

For example, the position of each user may be acquired, respectively, the virtual character of the opposite user may be displayed on the virtual reality screen, in order to achieve centralized display of virtual characters of multiple users. Then, based on development manner of a variety of games, it can achieve various interaction operations such as games, fighting, and the like between each virtual character on the screen. The discrete information interaction flow diagram between multiple users can refer to FIG. 5.

For example, a series of virtual character trigger events may be set in advance, and these virtual character trigger events correspond to trigger geography locations. When it is determined whether the smart terminal reaches the trigger geography location according to the position, the trigger virtual character performs specially the virtual character trigger events. A hospital in reality may be set as a trigger geography location, and the corresponding virtual character trigger event is set as life enhance event. Then, when the user of the smart terminal moves to the hospital in reality, it is determined whether the smart terminal reaches the hospital according to the position of the smart terminal, it enables the virtual character to perform the virtual character trigger event corresponding to the trigger geography location, i.e., the virtual character may enhance its life through those operations such as "treating" and "blooding" in the hospital.

While some smart terminal browsers are listed in the above description, the person skilled in the art will recognize that the embodiments of the present invention are not limited to these browsers, but may be applicable to any applications which can be used to display files in the web server or the file system and enable the user to interact with these files. These applications may be various common browsers, and may be also any other applications having web browsing function.

Based on the above detailed analysis, an embodiment of the present invention further provides a device for interacting with the virtual character in the smart terminal.

Figure 4:
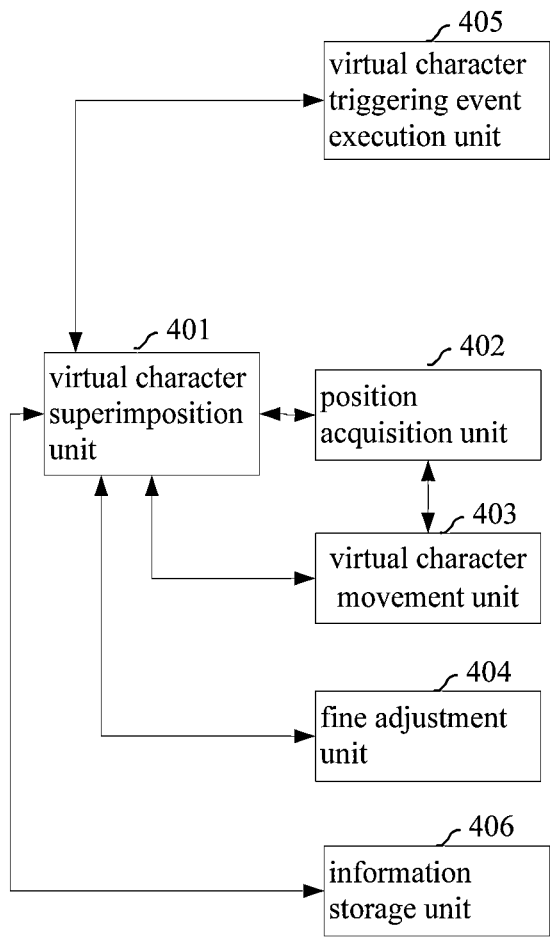
FIG. 4 is a structural diagram showing a device for interacting with a virtual character in a smart terminal according to an embodiment of the present invention.

FIG. 4 is a structural diagram showing a device for interacting with the virtual character in the smart terminal according to an embodiment of the present invention.

As shown in FIG. 4, the device includes:

a virtual character superimposition unit 401 for shooting and displaying a user reality scene image on a screen of a smart terminal, and superimposing the virtual character on the user reality scene image;

a position acquisition unit 402 for acquiring position of the smart terminal during movement; and a virtual character movement unit 403 for determining whether change of the position of the smart terminal exceeds a preset threshold value, and if the result is "YES", moving the virtual character in the user reality scene image according to the current position of the smart terminal.

In one embodiment, the position acquisition unit 402 is used for acquiring the position of the smart terminal during movement by applying GPS positioning, GPRS positioning, Bluetooth positioning, Wifi positioning or mobile communication network base station positioning.

Preferably, the device further comprises:

a fine adjustment unit 404 for acquiring swing degree of a swing of the screen of the smart terminal when the swing is detected; swinging the virtual character superimposed on the user reality scene image at the swing angle in a direction opposite to the swing to maintain absolute positioning of the virtual character on the user reality scene image.

In one embodiment, the device further comprises:

a virtual character triggering event execution unit 405 for storing a set trigger geography location and a virtual character trigger event corresponding to the trigger geography location, determining whether the smart terminal reaches the trigger geography location according to the position of the smart terminal, and if the result is "YES", enabling the virtual character to perform the virtual character trigger event corresponding to the trigger geography location.

Preferably, the device further comprises:

an information storage unit 406 for setting user account information of the smart terminal, in which the correspondence relationship between the smart terminal user and the virtual character is stored, and the attribute information of the virtual character.

In an embodiment of the present invention, a plurality of user accounts of smart terminals may be provided, these smart terminal users achieve online through networking.

Based on the networking interaction of the plurality of user accounts of smart terminals, an embodiment of the present invention also provides a system for interacting with virtual characters in smart terminals.

Figure 5:
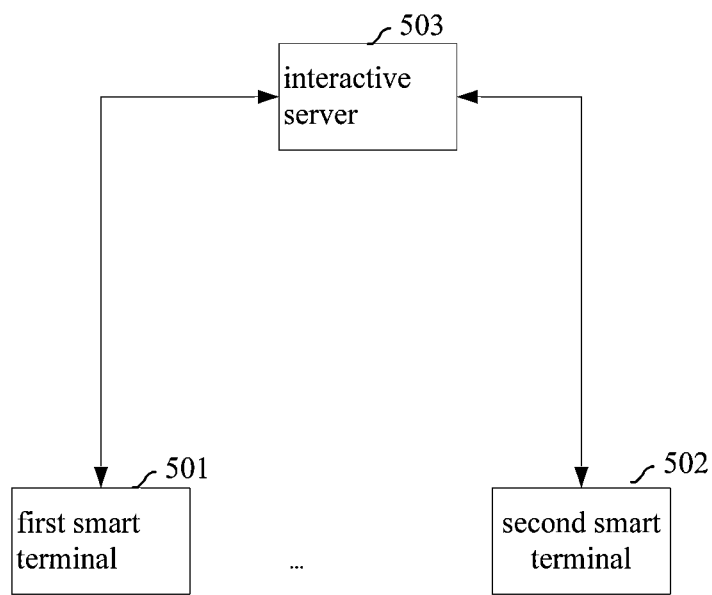
FIG. 5 is a structural diagram showing a system for interacting with virtual characters in smart terminals according to an embodiment of the present invention.

FIG. 5 is a structural diagram showing a system for interacting with virtual characters in smart terminals according to an embodiment of the present invention. As shown in FIG. 5, the system includes:

a first smart terminal 501 for shooting and displaying a first smart terminal user reality scene image on the screen, superimposing a first virtual character on the first smart terminal user reality scene image, and sending information of the first virtual position of the first virtual character in the first smart terminal user reality scene image to the an interactive server; acquiring position of the first smart terminal during movement, determining whether change of the position of the first smart terminal exceeds a preset threshold value, and if the result is "YES", moving the first virtual character in the first smart terminal user reality scene image according to the current position of the first smart terminal;

a second smart terminal 502 for shooting and displaying a second smart terminal user reality scene image on the screen, superimposing a second virtual character on the second smart terminal user reality scene image, and sending information of the second virtual position of the second virtual character in the second smart terminal user reality scene image to the interactive server; acquiring position of the second smart terminal during movement, determining whether change of the position of the second smart terminal exceeds a preset threshold value, and if the result is "YES", moving the second virtual character in the second smart terminal user reality scene image according to the current position of the second smart terminal; and the interactive server 503 for storing the information of the first virtual position of the first virtual character in the first smart terminal user reality scene image and the information of the second virtual position of the second virtual character in the second smart terminal user reality scene image, and transferring the first virtual character to the first virtual position on the second smart terminal user reality scene image and the second virtual character to the second virtual position on the first smart terminal user reality scene image when distance from the first virtual position to the second virtual position is less than the preset threshold value.

In one embodiment, the first smart terminal 501 is used for acquiring screen directing information of the first smart terminal according to a compass and sending the screen directing information of the first smart terminal to the interactive server.

The second smart terminal 502 is used for acquiring screen directing information of the second smart terminal according to the compass and sending the screen directing information of the second smart terminal to the interactive server.

The interactive server 503 is used for transferring the first virtual character to the first virtual position on the second smart terminal user reality scene image according to the screen directing information of the second smart terminal 502, and transferring the second virtual character to the second virtual position on the first smart terminal user reality scene image according to the screen directing information of the first smart terminal 501.

Preferably, the interactive server 503 is further used for storing user account information of the first and second smart terminals and attribute information of the first and second virtual characters which may include the growth information of the virtual character, for example different status such as childhood, youth, and maturity; and different states of the virtual characters, such as happiness, anger, coquetry and so on.

Actually the system can includes two or more smart terminals. The above first and second smart terminals are only examples of the two or more smart terminals for illustrating the implementation of the system.

In fact, the method and device for interacting with the virtual character in the smart terminal proposed by the embodiments of the present invention may be specially implemented by various manners. For example, in case of following certain standardized application interfaces, the method for interacting with the virtual character may be programmed to a plug-in installed into personal computers, mobile devices, and the like, and may also be packaged as an application for users to download. When it is programmed to the plug-in, it may be executed as many plug-in forms such as ocx, dll, and cab. The method for interacting with the virtual character in the smart terminal proposed by the embodiments of the present invention may be specially implemented by specific techniques such as Flash plug-in, RealPlayer plug-in, MMS plug-in, MIDI stave plug-in and ActiveX plug-in.

The method for interacting with the virtual character in the smart terminal proposed by the embodiments of the present invention may be stored in various storage media by storage means of instruction or set of instructions, and executed by at least one processor. These storage media include, but are not limited to, a floppy disk, CD, DVD, hard disk, flash disk, U disk, CF card, SD card, MMC card, SM card, Memory Stick, xD card, and so on.

In addition, the method for interacting with the virtual character in the smart terminal proposed by the embodiments of the present invention may be applied to Nand flash based storage media, such as U disk, CF card, SD card, SDHC card, MMC card, SM card, Memory Stick, xD card, and so on.

As above, In an embodiment of the present invention, the user reality scene image is shot and displayed on the screen of the smart terminal, the virtual character is superimposed on the user reality scene image; position of the smart terminal during movement is acquired; it is determined whether change of the position of the smart terminal exceeds a preset threshold value, and if the result is "YES", the virtual character is moved in the user reality scene image according to the current position of the smart terminal. Thus, after the embodiment of the present invention is applied, reality scenes are recorded as the virtual interaction scenes using the photographing technology, virtual characters are obtained in the real scene, and the following operation of virtual characters may be controlled based on movement of the user. Since interaction scenes between the user and the virtual character are not virtual scenes but true reality scenes, both numbers and contents of the scenes are not limited, and the interaction efficiency in these manners is higher.

Moreover, since interactive scenes are true reality scenes and do not need to be designed and developed by the designer and developer, and both development cost and maintenance cost are reduced.

The above description is only illustrative of preferred embodiments of the present invention, and it is not intended to limit the scope of the present disclosure. Any modification, equivalent replacement and improvement made within the spirit and principle of the present disclosure should fall in scope of the present disclosure.

What is claimed is:

1. A method for interacting with a virtual character in a smart terminal, comprising:
   shooting a user reality scene image using a camera unit of the smart terminal;
   displaying the user reality scene image on a screen of a display of the smart terminal, and superimposing the virtual character on the user reality scene image with Augmented Reality (AR) technology;
   acquiring a change of position of the smart terminal during movement;
   determining the change of position of the smart terminal exceeds a preset threshold value, and if the change of position of the smart terminal exceeds the preset threshold value, moving the virtual character in the user reality scene image to a current position of the smart terminal;

detecting a swing of the screen of the smart terminal via a direction sensor, and acquiring a swing angle of the swing; and swinging the virtual character superimposed on the user reality scene image at the swing angle in a direction opposite to the swing to maintain absolute positioning of the virtual character on the user reality scene image.

2. The method for interacting with the virtual character in the smart terminal according to claim 1, characterized in that the step of acquiring the position of the smart terminal during movement comprises:

acquiring the change of position of the smart terminal during movement by applying GPS positioning, GPRS positioning, Bluetooth positioning, Wifi positioning or mobile communication network base station positioning.

3. The method for interacting with the virtual character in the smart terminal according to claim 1, characterized in that the method further comprises:

detecting movement amount of the smart terminal during movement of the smart terminal based on image recognition with regard to change in the reality scene image; and determining whether the movement amount of the smart terminal exceeds a preset threshold value, and if the movement amount of the smart terminal exceeds the preset threshold value, moving the virtual character in the user reality scene image according to the current movement position of the smart terminal.

4. The method for interacting with the virtual character in the smart terminal according to claim 1, characterized in that the method further comprises:

setting in advance a trigger geography location and a virtual character trigger event corresponding to the trigger geography location; and determining whether the smart terminal reaches the trigger geography location according to the position of the smart terminal, and if the smart terminal reaches the trigger geography location, enabling the virtual character to perform the virtual character trigger event corresponding to the trigger geography location.

5. A device for interacting with a virtual character in a smart terminal, comprising:

a virtual character superimposition unit configured for shooting a user reality scene image using a camera unit of the smart terminal, displaying the user reality scene image on a screen of a display of the smart terminal and superimposing the virtual character on the user reality scene image with AR technology;

a position acquisition unit configured for acquiring a change of position of the smart terminal during movement via a direction sensor;

a virtual character movement unit configured for determining whether the change of position of the smart terminal exceeds a preset threshold value, and if the change of position of the smart terminal exceeds the preset threshold value, moving the virtual character in the user reality scene image to the current position of the smart terminal; and a fine adjustment unit configured for acquiring swing angle of swing of the screen of the smart terminal when the swing is detected, and swinging the virtual character superimposed on the user reality scene image at the swing angle in a direction opposite to the swing to maintain absolute positioning of the virtual character on the user reality scene image.

6. The device for interacting with the virtual character in the smart terminal according to claim 5, characterized in that:

the position acquisition unit acquires the change of position of the smart terminal during movement by applying GPS positioning, GPRS positioning, Bluetooth positioning, Wifi positioning or mobile communication network base station positioning.

7. The device for interacting with the virtual character in the smart terminal according to claim 5, characterized in that:

the fine adjustment unit detects movement amount of the smart terminal during movement of the smart terminal based on image recognition with regard to change in the reality scene image, determines whether the movement amount of the smart terminal exceeds a preset threshold value, and if the movement amount of the smart terminal exceeds the preset threshold value, moves the virtual character in the user reality scene image according to the current movement position of the smart terminal.

8. The device for interacting with the virtual character in the smart terminal according to claim 5, further comprises:

a virtual character triggering event execution unit configured for storing a set trigger geography location and a virtual character trigger event corresponding to the trigger geography location, determining whether the smart terminal reaches the trigger geography location according to the position of the smart terminal, and if the smart terminal reaches the trigger geography location, enabling the virtual character to perform the virtual character trigger event corresponding to the trigger geography location.

9. A system for interacting with virtual characters in smart terminals, comprising:

a first smart terminal configured for shooting a user reality scene image at a camera unit of the first smart terminal, displaying the first smart terminal user reality scene image on a screen of a display of the first smart terminal, superimposing a first virtual character on the first smart terminal user reality scene image with AR technology, and sending information of the first virtual position of the first virtual character in the first smart terminal user reality scene image to an interactive server; acquiring position of the first smart terminal during movement, determining whether change of the position of the first smart terminal exceeds a preset threshold value, and if the change of the position of the first smart terminal exceeds the preset threshold value, moving the first virtual character in the first smart terminal user reality scene image to the current position of the first smart terminal;

a second smart terminal configured for shooting a user reality scene image at a camera unit of the second smart terminal, displaying the second smart terminal user reality scene image on a screen of a display of the second smart terminal, superimposing a second virtual character on the second smart terminal user reality scene image with AR technology, and sending information of the second virtual position of the second virtual character in the second smart terminal user reality scene image to the interactive server; acquiring position of the second smart terminal during movement, determining whether change of the position of the second smart terminal exceeds a preset threshold value, and if the change of the position of the second smart terminal exceeds the preset threshold value, moving the second virtual character in the second smart terminal user reality scene image according to the current position of the second smart terminal; and the interactive server configured for storing the information of the first virtual position of the first virtual character in the first smart terminal user reality scene image and the information of the second virtual position of the second virtual character in the second smart terminal user reality scene image, and transferring the first virtual character to the first virtual position on the second smart terminal user reality scene image and the second virtual character to the second virtual position on the first smart terminal user reality scene image when distance from the first virtual position to the second virtual position is less than a preset threshold value;

wherein the first smart terminal acquires screen directing information of the first smart terminal by compass, and sends the screen directing information of the first smart terminal to the interactive server;

the second smart terminal acquires screen directing information of the second smart terminal by a compass, and sends the screen directing information of the second smart terminal to the interactive server; and the interactive server transfers the first virtual character to the first virtual position on the second smart terminal user reality scene image according to the screen directing information of the second smart terminal, and transfers the second virtual character to the second virtual position on the first smart terminal user reality scene image according to the screen directing information of the first smart terminal.

10. The system for interacting with the virtual characters in the smart terminals according to claim 9, characterized in that:

the interactive server further stores user account information of the first and second smart terminals and attribute information of the first and second virtual characters.

\* \* \* \* \*